United States Patent
Hyde et al.

(10) Patent No.: US 7,957,892 B2
(45) Date of Patent: Jun. 7, 2011

(54) CONDITION-SENSITIVE EXHAUST CONTROL

(75) Inventors: Roderick A. Hyde, Redmond, WA (US); Muriel Y. Ishikawa, Livermore, CA (US); Jordin T. Kare, Seattle, WA (US); Thomas J. Nugent, Jr., Issaquah, WA (US); Lowell L. Wood, Jr., Bellevue, WA (US); Victoria Y. H. Wood, Livermore, CA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 195 days.

(21) Appl. No.: 12/006,274

(22) Filed: Dec. 31, 2007

(65) Prior Publication Data

US 2009/0171549 A1    Jul. 2, 2009

(51) Int. Cl.
G06F 19/00 (2011.01)
F02D 41/14 (2006.01)
F01N 3/08 (2006.01)

(52) U.S. Cl. .............. 701/115; 60/274; 60/285; 701/102
(58) Field of Classification Search .......... 701/101–105, 701/109, 110, 111, 115, 207, 213; 180/167–169; 60/274, 285

See application file for complete search history.

(56) References Cited

U.S. PATENT DOCUMENTS

| | | | |
|---|---|---|---|
| 4,169,441 A | 10/1979 | Hirano et al. | |
| 4,683,455 A | 7/1987 | Kido et al. | |
| 5,247,440 A | 9/1993 | Capurka et al. | |
| 5,566,072 A | 10/1996 | Momose et al. | |
| 5,652,911 A | 7/1997 | Van Venrooy et al. | |
| 5,860,020 A | 1/1999 | Van Venrooy et al. | |
| 6,112,151 A | 8/2000 | Kruse | |
| 6,151,549 A | 11/2000 | Andrews et al. | |
| 6,283,086 B1 | 9/2001 | Yamamoto et al. | |
| 6,411,887 B1 * | 6/2002 | Martens et al. | 701/115 |
| 6,749,269 B1 | 6/2004 | Niwa | |
| 7,062,371 B2 | 6/2006 | Gault et al. | |
| 7,359,786 B2 | 4/2008 | Lindqvist | |
| 7,522,994 B2 * | 4/2009 | Durand | 701/207 |
| 2001/0021893 A1 | 9/2001 | Weisman, II | |
| 2002/0116117 A1 | 8/2002 | Martens et al. | |
| 2002/0163418 A1 | 11/2002 | Nemoto | |
| 2003/0182026 A1 | 9/2003 | Awada et al. | |
| 2005/0031100 A1 | 2/2005 | Iggulden et al. | |
| 2006/0041337 A1 | 2/2006 | Augsburger et al. | |
| 2006/0064232 A1 | 3/2006 | Ampunan et al. | |
| 2006/0073761 A1 | 4/2006 | Weiss et al. | |
| 2006/0293102 A1 | 12/2006 | Kelsey | |
| 2007/0060018 A1 | 3/2007 | Chou | |
| 2007/0135016 A1 | 6/2007 | Ihara | |
| 2007/0143007 A1 | 6/2007 | Durand | |
| 2008/0108273 A1 | 5/2008 | Alden | |

(Continued)

FOREIGN PATENT DOCUMENTS

JP    2007066183 A * 3/2007 .................... 701/115

OTHER PUBLICATIONS

U.S. Appl. No. 12/006,268, Roderick A. Hyde et al.
U.S. Appl. No. 12/006,262, Roderick A. Hyde et al.

(Continued)

*Primary Examiner* — Willis R Wolfe, Jr.

(57) ABSTRACT

A method and exhaust control system for controlling a vehicle, including adjusting a vehicle parameter in response to a determined ambient condition or to local time.

30 Claims, 5 Drawing Sheets

U.S. PATENT DOCUMENTS

2008/0312788 A1    12/2008  Aulakh et al.
2009/0171547 A1*   7/2009   Hyde et al. .................... 701/102
2009/0171548 A1*   7/2009   Hyde et al. .................... 701/102
2009/0171555 A1*   7/2009   Hyde et al. .................... 701/115
2010/0125402 A1    5/2010   Bansal et al.

OTHER PUBLICATIONS

U.S. Appl. No. 12/006,237, Roderick A. Hyde et al.
PCT International Search Report; International App. No. PCT/US2008/013939; pp. 1-4; Apr. 14, 2009.

* cited by examiner

CONDITION-SENSITIVE EXHAUST CONTROL

SUMMARY

In one aspect, a method of controlling an engine in a vehicle includes broadcasting a control signal to the vehicle during operation of the engine, the signal including instructions for modification of a vehicle operating parameter (e.g., compression ratio, timing of commencement of fuel combustion, timing of fuel injection, timing of fuel introduction into an air-inlet stream, valve timing, fuel composition, fuel-oxidizer ratio, air inlet temperature, air inlet pressure, number of operating cylinders, battery usage, battery charge, engine or drive-train usage of electrical energy, engine operating rate, output torque, exhaust gas temperature, exhaust gas temperature profile, exhaust gas composition, exhaust gas back pressure, catalytic converter reactive area, exhaust gas flow path, catalyst selection, sequestration of at least one exhaust gas component, exhaust gas flow rate, exhaust particulates density, exhaust particulate composition, exhaust particulate size, concentration of exhaust components at a selected location in an exhaust flow path, coolant temperature, or inlet-exhaust thermal coupling). Broadcasting a control signal may include sending an electromagnetic control signal (e.g., a wireless signal), an optical control signal, or an acoustic control signal. The control signal may be broadcast to a plurality of vehicles, or a second control signal may be broadcast to a second vehicle. The method may further include receiving an acknowledgement signal from the vehicle (e.g., a signal including identifying information, location, information about the vehicle operating parameter such as changes made in response to the control signal, or information about other vehicle operating parameter(s)). A control signal may be selected for broadcast responsive to one or more acknowledgement signals. The method may further include transmitting information about the acknowledgement signal or the control signal to a remote compliance system. Broadcasting may include broadcasting verifying information selected to allow the vehicle to determine authenticity of the control signal. The method may include determining an identifying property of the vehicle, for example by receiving an identifying signal from the vehicle, where selecting the control signal is in response to the identifying property (e.g., car make, car model, engine type, exhaust type, vehicle identification number, license number, location, settings of the engine control unit, or fuel type). The control signal may include a first set of instructions for a vehicle having a first characteristic (e.g., vehicle type or vehicle operating parameter), and a second set of instructions for a vehicle having a second characteristic. The control signal may include instructions to select one member of a group of preprogrammed instruction sets. The control signal may be selected probabilistically, or may include a condition for performing the instructions such as a probabilistic condition. Instructions for modification of the vehicle operating parameter may include a designated value, designated range, designated average value within a time interval, or designated time profile for the vehicle operating parameter, or may include instructions for modification of a plurality of vehicle operating parameters. Instructions may be at least partially based on previous compliance history for the vehicle. The control signal may be selected responsive to an environmental parameter (e.g., temperature, pressure, partial pressure of an atmospheric component, local level of a selected pollutant, local insolation values, humidity, precipitation, wind conditions, road cover conditions, time, traffic conditions, local rules, altitude, or local level of CO, $CO_2$, $NO_x$, $O_3$, or airborne particulates), including a predicted environmental parameter.

In another aspect, a control system for controlling an operating parameter of vehicles in a target area includes a control signal broadcast unit configured to broadcast a control signal (e.g., an electromagnetic control signal such as a wireless signal, an optical control signal, or an acoustic control signal) including instructions for modification of a vehicle operating parameter (e.g., compression ratio, timing of commencement of fuel combustion, timing of fuel injection, timing of fuel introduction into an air-inlet stream, valve timing, fuel composition, fuel-oxidizer ratio, air inlet temperature, air inlet pressure, number of operating cylinders, battery usage, battery charge, engine or drive-train usage of electrical energy, engine operating rate, output torque, exhaust gas temperature, exhaust gas temperature profile, exhaust gas composition, exhaust gas back pressure, catalytic converter reactive area, exhaust gas flow path, catalyst selection, sequestration of at least one exhaust gas component, exhaust gas flow rate, exhaust particulates density, exhaust particulate composition, exhaust particulate size, concentration of exhaust components at a selected location in an exhaust flow path, coolant temperature, or inlet-exhaust thermal coupling) to at least one vehicle in the target area. The control system may further include a signal determination unit configured to select instructions for modification of the vehicle operating parameter for incorporation into the control signal. The signal determination unit may be, for example, configured to allow an operator to select the vehicle operating parameter, to use a lookup table to determine a permitted value or range of values for the vehicle operating parameter, or to select a permitted value or range of values for the vehicle operating parameter in response to an environmental condition (e.g., temperature, pressure, partial pressure of an atmospheric component, local level of a selected pollutant, local insolation values, humidity, precipitation, wind conditions, road cover conditions, time, traffic conditions, local rules, altitude, or local level of CO, $CO_2$, $NO_x$, $O_3$, or airborne particulates), including a predicted environmental condition. The control signal broadcast unit may be configured to broadcast a control signal including instructions conditional on a vehicle characteristic (e.g., vehicle type or one or more vehicle operating parameters. It may be configured to broadcast a control signal including instructions to select one member of a group of preprogrammed instruction sets. The control signal may be selected probabilistically, or may include a condition for performing the instructions such as a probabilistic condition. Instructions for modification of the vehicle operating parameter may include a designated value, designated range, designated average value within a time interval, or designated time profile for the vehicle operating parameter, or may include instructions for modification of a plurality of vehicle operating parameters. Instructions may be at least partially based on previous compliance history for the vehicle. The control system may further include an acknowledgement signal receiving unit configured to receive an acknowledgement signal from the vehicle (e.g., a signal including identifying information, location, information about the vehicle operating parameter such as compliance actions taken, or information about other vehicle operating parameter(s)). The control system may further include a compliance transmitter configured to transmit information about the control signal or the acknowledgement signal to a remote compliance system. A control signal may be selected for broadcast responsive to one or more acknowledgement signals. The control system may include a vehicle identification units configured to determine a property of the vehicle, for example by receiving an identification signal, the control signal broadcast unit being configured to broadcast the control signal responsive to the determined vehicle property (e.g., car make, car model, engine type, exhaust type, vehicle identification number, license number, location, settings of the engine control unit, or fuel type). The control signal may include verifying information selected to allow the vehicle to determine authenticity of the control signal.

In yet another aspect, a method of operating a vehicle having an engine includes, during operation of the engine, receiving a control signal (e.g., an electromagnetic control signal such as a wireless signal, an optical control signal, or an acoustic control signal) broadcast from outside the vehicle, the control signal including instructions for modification of a vehicle operating parameter (e.g., compression ratio, timing of commencement of fuel combustion, timing of fuel injection, timing of fuel introduction into an air-inlet stream, valve timing, fuel composition, fuel-oxidizer ratio, air inlet temperature, air inlet pressure, number of operating cylinders, battery usage, battery charge, engine or drive-train usage of electrical energy, engine operating rate, output torque, exhaust gas temperature, exhaust gas temperature profile, exhaust gas composition, exhaust gas back pressure, catalytic converter reactive area, exhaust gas flow path, catalyst selection, sequestration of at least one exhaust gas component, exhaust gas flow rate, exhaust particulates density, exhaust particulate composition, exhaust particulate size, concentration of exhaust components at a selected location in an exhaust flow path, coolant temperature, or inlet-exhaust thermal coupling), and modifying the vehicle operating parameter in accordance with the instructions. The method may further including sending an acknowledgement signal in response to receiving a control signal, which may include, for example, information about the vehicle operating parameter, information about the modification of the vehicle operating parameter, information about identity of the vehicle, or information about one or more vehicle operating parameters. The method may further include sending an identifying signal characterizing a property of the vehicle (e.g., car make, car model, engine type, exhaust type, vehicle identification number, license number, location, settings of the engine control unit, or fuel type). Modifying the vehicle operating parameter in accordance with the instructions may include determining applicable portions of a signal conditional on a vehicle characteristic (e.g., vehicle type or one or more vehicle operating parameters) and modifying the vehicle operating parameter in accordance only with the applicable portions of the signal. Modifying the vehicle operating parameter may include selecting one of a plurality of preprogrammed instruction sets, or may include determining whether a condition included in the instructions obtains (e.g., a probabilistic condition) and modifying the vehicle operating parameter only if the condition obtains. Modifying the vehicle operating parameter may include maintaining a designated value, designated range, designated average value within a time interval, or designated time profile for the vehicle operating parameter, or may include modifying a plurality of vehicle operating parameters. The method may further include verifying authenticity of the control signal, for example before modifying the vehicle operating parameter.

In still another aspect, an engine control system for a vehicle having an engine includes a control signal receiving unit configured to receive a control signal (e.g., an electromagnetic control signal such as a wireless signal, an optical control signal, or an acoustic control signal) broadcast from outside the vehicle during engine operation, the control signal including instructions for modification of a vehicle operating parameter (e.g., compression ratio, timing of commencement of fuel combustion, timing of fuel injection, timing of fuel introduction into an air-inlet stream, valve timing, fuel composition, fuel-oxidizer ratio, air inlet temperature, air inlet pressure, number of operating cylinders, battery usage, battery charge, engine or drive-train usage of electrical energy, engine operating rate, output torque, exhaust gas temperature, exhaust gas temperature profile, exhaust gas composition, exhaust gas back pressure, catalytic converter reactive area, exhaust gas flow path, catalyst selection, sequestration of at least one exhaust gas component, exhaust gas flow rate, exhaust particulates density, exhaust particulate composition, exhaust particulate size, concentration of exhaust components at a selected location in an exhaust flow path, coolant temperature, or inlet-exhaust thermal coupling), and an engine controller configured to modify the vehicle operating parameter in accordance with the instructions. The engine control system may further include an acknowledgement signal sending unit configured to send an acknowledgement signal, for example indicating any modification of the vehicle operating parameter responsive to the control signal, indicating identity of the vehicle, indicating location of the vehicle, or indicating state or history of one or more vehicle operating parameters. The control signal receiving unit may be configured to determine authenticity of the control signal. It may be configured to receive a plurality of instruction sets, and to select at least one of the plurality corresponding to a characteristic of the vehicle (e.g., vehicle type or a vehicle operating parameter). It may be configured to receive an instruction to select one of a group of preprogrammed instruction sets, or to receive a conditional signal and to determine if the condition (e.g., a probabilistic condition) obtains, and to direct the engine controller to comply with the signal instructions only if the condition obtains. The engine controller may be configured to maintain a designated value, designated range, designated average value within a time interval, or designated time profile for the vehicle operating parameter, or to modify a plurality of vehicle operating parameters.

In yet still another aspect, an exhaust control system for a vehicle having an engine and an exhaust system includes an exhaust controller configured to determine an acceptable range for an exhaust parameter responsive to an ambient condition (e.g., temperature, pressure, partial pressure of an atmospheric component, local level of a selected pollutant, local insolation values, humidity, precipitation, wind conditions, road cover conditions, traffic conditions, local rules, altitude, or location, any of which may be a predicted value), and to direct the exhaust system to maintain the exhaust parameter within the acceptable range, the exhaust parameter being selected from the group consisting of exhaust gas temperature, exhaust gas temperature profile, exhaust gas composition, exhaust gas back pressure, catalytic converter reactive area, exhaust gas flow path, catalyst selection, sequestration of at least one exhaust gas component, exhaust gas flow rate, exhaust particulates density, exhaust particulate composition, exhaust particulate size, concentration of exhaust components at a selected location in an exhaust flow path, coolant temperature, and inlet-exhaust thermal coupling. The system may further include a compliance reporting unit configured to transmit a record of exhaust parameter adjustments (e.g., by wireless transmission). The system may further include an exhaust parameter sensor, the exhaust controller being configured to accept a sensor signal from the exhaust parameter sensor indicative of the state of the exhaust parameter and to use the sensor signal to direct the exhaust system to maintain the exhaust parameter within the acceptable range. Sensors may be, for example, electromagnetic sensors, spectroscopic sensors, thermal sensors, chemical sensors, pressure sensors, acoustic sensors, vibration sensors, mass sensors, electromechanical sensors, electrochemical sensors, microelectromechanical devices, or optical sensors, and may be configured to measure temperature, pressure, gas composition, vapor composition, particulate content, particulate composition, particulate size distribution, flow rate, density, force, strain, or displacement. The sensor may be internal or external to the vehicle. The exhaust controller may be configured to determine an acceptable range for an exhaust parameter responsive to an ambient condition by selecting from a set of exhaust profiles. The acceptable range for the exhaust parameter may include an acceptable range for a time-averaged value of the exhaust parameter during a time interval, an acceptable range for a designated function of the exhaust parameter, an acceptable range for a second exhaust parameter, or an acceptable range for a designated function of a plurality of exhaust parameters, an acceptable range for the value of the exhaust parameter during a probability weighted time interval, or a time profile for the acceptable range for the exhaust parameter.

In a further aspect, a vehicle control system for a vehicle having an engine and an exhaust system includes an exhaust controller configured to determine an acceptable range for a vehicle parameter for a selected local time period and to direct the vehicle to maintain the vehicle parameter within the acceptable range during the selected local time period, the vehicle parameter being selected from the group consisting of compression ratio, timing of commencement of fuel combustion, timing of fuel injection, timing of fuel introduction into an air-inlet stream, valve timing, fuel composition, fuel-oxidizer ratio, air inlet temperature, air inlet pressure, number of operating cylinders, battery usage, battery charge, engine or drive-train usage of electrical energy, engine operating rate, output torque, exhaust gas temperature, exhaust gas temperature profile, exhaust gas composition, exhaust gas back pressure, catalytic converter reactive area, exhaust gas flow path, catalyst selection, sequestration of at least one exhaust gas component, exhaust gas flow rate, exhaust particulates density, exhaust particulate composition, exhaust particulate size, concentration of exhaust components at a selected location in an exhaust flow path, coolant temperature, and inlet-exhaust thermal coupling. The vehicle may be configured to determine the acceptable range for the vehicle parameter for the selected local time period based at least in part on vehicle location. The vehicle control system may further include a compliance reporting unit configured to transmit a record of vehicle parameter adjustments (e.g., by a wireless transmission). The vehicle controller may include an internal clock, or may be configured to determine time from an external signal.

In yet a further aspect, a method of controlling an exhaust system in a vehicle includes determining an ambient condition (e.g., temperature, pressure, partial pressure of an atmospheric component, local level of a selected pollutant, local insolation values, humidity, precipitation, wind conditions, road cover conditions, traffic conditions, local rules, altitude, or location) and, responsive to the ambient condition, adjusting an exhaust parameter of the exhaust system selected from the group consisting of exhaust gas temperature, exhaust gas temperature profile, exhaust gas composition, exhaust gas back pressure, catalytic converter reactive area, exhaust gas flow path, catalyst selection, sequestration of at least one exhaust gas component, exhaust gas flow rate, exhaust particulates density, exhaust particulate composition, exhaust particulate size, concentration of exhaust components at a selected location in an exhaust flow path, coolant temperature, and inlet-exhaust thermal coupling. The method may further include transmitting a record of the adjusting of the exhaust parameter (e.g., by wireless transmission).

In still a further aspect, a method of controlling a vehicle includes, responsive to local time, adjusting a vehicle parameter of the vehicle selected from the group consisting of compression ratio, timing of commencement of fuel combustion, timing of fuel injection, timing of fuel introduction into an air-inlet stream, valve timing, fuel composition, fuel-oxidizer ratio, air inlet temperature, air inlet pressure, number of operating cylinders, battery usage, battery charge, engine or drive-train usage of electrical energy, engine operating rate, output torque, exhaust gas temperature, exhaust gas temperature profile, exhaust gas composition, exhaust gas back pressure, catalytic converter reactive area, exhaust gas flow path, catalyst selection, sequestration of at least one exhaust gas component, exhaust gas flow rate, exhaust particulates density, exhaust particulate composition, exhaust particulate size, concentration of exhaust components at a selected location in an exhaust flow path, coolant temperature, and inlet-exhaust thermal coupling. The method may further include transmitting a record of the adjusting of the vehicle parameter (e.g., by wireless transmission).

In yet still a further aspect, an engine control system for a vehicle having an engine includes an engine controller configured to determine an acceptable range for an engine operating parameter responsive to traffic conditions and to direct the engine to maintain the engine operating parameter within the acceptable range, the engine operating parameter being selected from the group consisting of compression ratio, timing of commencement of fuel combustion, timing of fuel injection, timing of fuel introduction into an air-inlet stream, valve timing, fuel composition, air inlet temperature, air inlet pressure, number of operating cylinders, battery usage, battery charge, engine or drive-train usage of electrical energy, engine operating rate, and output torque. The engine control system may further include a compliance reporting unit configured to transmit a record of engine operating parameter adjustments. The engine controller may be configured to receive a traffic condition signal from an external source (e.g., a central repository of traffic information or another vehicle), or may be configured to monitor vehicle operation in order to determine traffic conditions.

In an additional aspect, a method of controlling a vehicle having an engine includes, responsive to traffic conditions, determining an acceptable range for an engine operating parameter and directing the engine to maintain the engine operating parameter within the acceptable range, the engine operating parameter selected from the group consisting of compression ratio, timing of commencement of fuel combustion, timing of fuel injection, timing of fuel introduction into an air-inlet stream, valve timing, fuel composition, air inlet temperature, air inlet pressure, number of operating cylinders, battery usage, battery charge, engine or drive-train usage of electrical energy, engine operating rate, and output torque. The method may further include transmitting a record of engine operating parameter adjustments (e.g., wirelessly). The method may include receiving a traffic condition signal from an external source (e.g., a central repository of traffic information or another vehicle), monitoring vehicle operation in order to determine traffic conditions.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
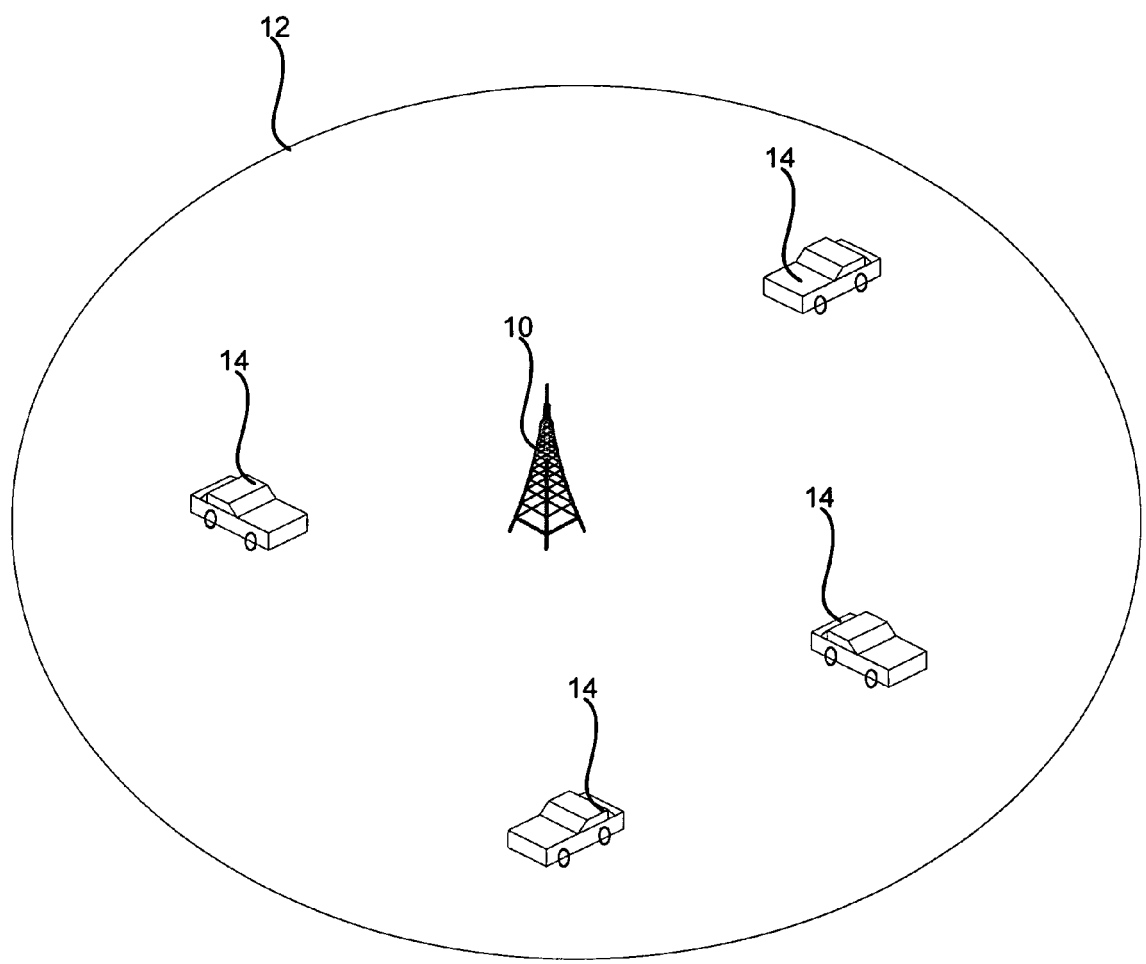
FIG. 1 is a schematic showing a control system for controlling vehicle emissions in a geographic area.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

As used herein, the term "vehicle" encompasses devices for conveying persons or objects, including without limitation automobiles, trucks, trains, and other land conveyances, boats, ships, and other watergoing vessels, and aircraft. In some embodiments, vehicles may possess internal combustion engines, but conveyances using other sources of locomotive power are also encompassed in the term "vehicle".

FIG. 1 is a schematic showing a control system for controlling vehicle emissions in a geographic area. Control tower 10 broadcasts a control signal including instructions for modifying a vehicle operating parameter (e.g., compression ratio, timing of commencement of fuel combustion, timing of fuel injection, timing of fuel introduction into an air-inlet stream, valve timing, fuel composition, fuel-oxidizer ratio, air inlet temperature, air inlet pressure, number of operating cylinders, battery usage, battery charge, engine or drive-train usage of electrical energy, engine operating rate, output torque, exhaust gas temperature, exhaust gas temperature profile, exhaust gas composition, exhaust gas back pressure, catalytic converter reactive area, exhaust gas flow path, catalyst selection, sequestration of at least one exhaust gas component, exhaust gas flow rate, exhaust particulates density, exhaust particulate composition, exhaust particulate size, concentration of exhaust components at a selected location in an exhaust flow path, coolant temperature, or inlet-exhaust thermal coupling) to vehicles 14 in a defined area 12 around the tower 10. (In other embodiments, control tower 10 may be replaced by other systems that broadcast to vehicles in a selected area, such as a satellite communications system, a peer-to-peer network, a bucket-brigade network, or other means of communication between at least one central point and a vehicle.) Vehicles 14 receive the broadcast signal from control tower 10 and adjust their operating parameters to comply with the instructions. For example, a municipality may specify that within its boundaries, fuel-oxidizer ratios must be lean, and may erect one or more control towers 10 that broadcast signals instructing vehicles 14 to adjust their fuel injection systems to comply.

The instructions for the operating parameter may be adjusted according to ambient conditions (e.g., temperature, pressure, partial pressure of an atmospheric component, local level of a selected pollutant, local insolation values such as local UV fraction, humidity, precipitation, wind conditions such as magnitude or direction, road cover conditions, time, traffic conditions, local rules, altitude, or local level of CO, $CO_2$, $NO_x$, $O_3$, or airborne particulates), including predicted ambient conditions. For example, richer fuel mixtures may be allowed when colder weather is predicted, or when local air pollution levels are found to be relatively low. Vehicles configured to run on more than one possible fuel composition may be directed which fuel to use, for example in response to ambient weather conditions or to traffic patterns.

The control signal broadcast by control tower 10 may be an electromagnetic signal (e.g., a digital signal), an optical signal, or an acoustic signal. In some embodiments, the control tower 10 may broadcast a plurality of different signals, for example at the same time or in succession. For example, different signals may be intended for different vehicles or classes of vehicles, or for vehicles in different areas. The control tower 10 may also broadcast a conditional signal. For example, the signal may direct that if a vehicle has a certain property (e.g., make, model, number of cylinders, fuel type, or other operating parameter), then it should operate with an operating parameter in a particular range. The range may also be conditional on other vehicle properties or operating parameters. Vehicles 14 may transmit information about their properties or operating parameters to the control tower 10. For example, a control tower may note that there are cars of three makes in its vicinity by reading their transmissions, and may then broadcast a signal tailored to those three makes, such as a conditional signal that specifies an operating parameter for each of those three makes. Rather than explicitly setting a value or range for an operating parameter, the control tower 10 may broadcast a signal directing the vehicle 14 to select from one or more preprogrammed instruction sets (e.g., instructing the vehicle to switch to a carbon monoxide emission minimizing mode).

The control tower 10 may also select a control signal for broadcast probabilistically. For example, the control tower 10 may select every fourth vehicle (or a randomly selected 25%, or any other percentage) of vehicles to shift to a lower-emissions mode. The control signal may also include a condition for performing the functions. This condition may be deterministic (e.g., if exhaust back pressure exceeds a threshold value, adjust compression ratios) or probabilistic (e.g., generate a random or pseudorandom number between 0 and 1, and shift to a low-emissions mode if it exceeds 0.75).

In some embodiments, the control signal may include a designated value for the vehicle operating parameter. In other embodiments, the control signal may include a designated range, a designated average value, or a designated time profile for the vehicle operating parameter (e.g., an instruction to run in a lower-emissions mode during a particular time interval). The control signal may include instructions for modifying a plurality of vehicle operating parameters. In some embodiments, the instructions may be at least partially based on previous compliance history for the vehicle (e.g., sending more stringent instructions to vehicles that have not previously complied). The control tower 10 may also notify enforcement agents (e.g., the local police) of noncompliance of specific vehicles or of the existence of a noncompliant vehicle in a particular area. Control signals to be sent may be generated by a signal determination unit (not shown), and may be determined automatically or by an operator (onsite or remote).

The control tower 10 may also receive an acknowledgement signal from one or more vehicles. The acknowledgement signal may include identifying information for the vehicle (e.g., make or model of car, engine type, exhaust type, VIN, license number, or settings of the engine control unit), location information for the vehicle, information about one or more vehicle operating parameters (e.g., values of one or more operating parameters, or information about changes made in a vehicle operating parameter in response to the control signal), or information about the received signal (e.g., confirming that the signal was received correctly or identifying which signal was received). The control tower 10 may transmit information about the acknowledgement signal (e.g., confirmation that the vehicle has complied with the control signal) or the control signal to a remote compliance system (not shown). The control tower 10 may select a control signal responsive to one or more acknowledgement signals (e.g., the tower may adjust the control signals that it sends depending on the number or type of acknowledgement signals received).

The control tower 10 may further include a vehicle identification unit (not shown), which may be configured to determine a property of a vehicle (e.g., make, model, engine type, exhaust type, VIN, license number, location, settings of the engine control unit, or fuel type). In some embodiments, the control signal may be determined at least in part based on the determined vehicle property.

In some embodiments, a vehicle 14 may verify authenticity of the control signal before modifying the vehicle operating parameter in accordance with its instructions. For example, the vehicle 14 may decrypt the signal, or may transmit a signal requesting that the control tower 10 broadcast an authentication sequence, or may recognize that the signal includes self-authenticating elements.

Figure 2:
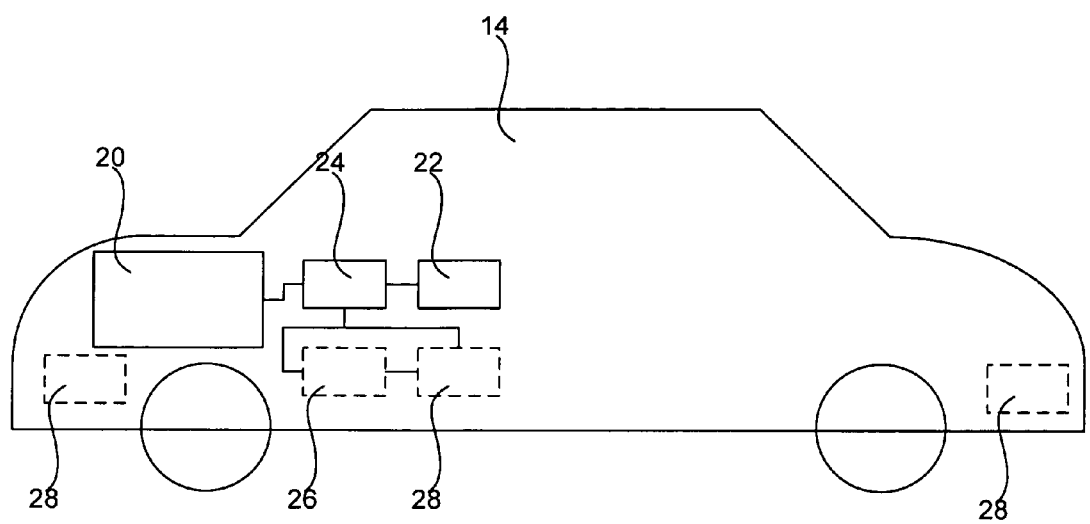
FIG. 2 is a schematic of a vehicle control system.

FIG. 2 is a schematic of a vehicle control system. Vehicle 14 includes an engine 20, a control signal receiving unit 22, and an engine controller 24. It may also include acknowledgement signal sending unit 26 or optional sensors 28, which may be configured to exchange information with engine controller 24 or acknowledgement signal sending unit 26. Control signal receiving unit 22 is configured to receive a broadcast signal from outside the vehicle (e.g., a control signal such as that sent by control tower 10 described herein). The broadcast signal includes instructions for modifying a vehicle operating parameter. The receiving unit 22 then communicates with the engine controller 24, which carries out the instructions.

In some embodiments, the receiving unit 22 may perform other functions, such as signal filtering. For example, a broadcast signal may not be applicable to all vehicles, and the receiving unit 22 may determine whether the signal is applicable and transmit the instructions to engine controller 24 only if they apply to vehicle 14. The receiving unit may also include circuitry for determining whether the broadcast signal is authentic, and transmit the instructions to engine controller 24 only if they are determined to originate from a broadcaster with authority to direct the requested changes to vehicle operation. Receiving unit 22 or other components may also determine that vehicle 14 cannot safely comply with the received instructions, and may decline to transmit the instructions to engine controller 24 or may countermand previously transmitted instructions if compliance would be unsafe.

Engine controller 24 alters engine settings as necessary to comply with broadcast instructions. For example, in engines capable of running at a variable compression ratio, the broadcast signal may specify a particular compression ratio, in which case engine controller 24 directs engine 20 accordingly. Alternatively, the broadcast signal may specify that the compression ratio is to be adjusted to place some other operating parameter within a specific range, for example to specify that exhaust gas may contain no more than a selected quantity of $NO_x$. (It will be understood that while compression ratio is referred to in these examples, other vehicle operating parameters may also be used, including without limitation combustion timing, fuel composition, fuel-oxidizer ratio, exhaust temperature, exhaust temperature profile, exhaust gas mixture, exhaust gas back pressure, catalytic area, exhaust flow path, catalyst selection, number of operating cylinders, battery usage, engine usage of electrical energy, exhaust gas sequestration, inlet temperature, or inlet-exhaust thermal coupling. In particular, some examples of engines which may operate with variable compression ratios or variable numbers of operating cylinders may be found in copending and commonly owned U.S. application Ser. No. 11/973,297, filed Oct. 4, 2007 and entitled "ELECTROMAGNETIC ENGINE," Ser. No. 11/973,343, filed Oct. 5, 2007 and entitled "FREE PISTON ELECTROMAGNETIC ENGINE," Ser. No. 11/973,640, filed Oct. 9, 2007 and entitled "OPPOSED PISTON ELECTROMAGNETIC ENGINE," and Ser. No. 11/974,173, filed Oct. 10, 2007 and entitled "METHOD OF RETROFITTING AN ENGINE," all of which are incorporated herein by reference.)

In some embodiments, the necessary modification of the engine operating parameter may be determined a priori by engine controller 24. In other embodiments, engine controller 24 may receive information from optional sensors 28. For example, gas sensors may provide information about exhaust composition, or temperature sensors may provide temperatures in different locations in the engine (e.g., combustion temperature or exhaust temperature). This sensor information may be used as a feedback control for engine controller 24 to further adjust one or more engine operating parameters. Suitable sensors for use in these embodiments include without limitation sensors for properties of gases or liquids such as temperature, pressure, density, flow rate, or composition (e.g., partial pressure sensors for specific gases), acoustic or vibration sensors, and force, strain, or displacement sensors for solid components. In some embodiments, sensors may be implemented using conventional electromechanical or electrochemical means (e.g., strain gages, oxygen sensors), microelectromechanical (MEMS) devices, optical sensing (e.g., absorption or emission spectrometers, optical thermometers) using free-space or fiber optics, or by other means.

The vehicle may also include optional acknowledgement signal sending unit 26. This unit may be configured to communicate with engine controller 24 or sensors 28 (if present) and to transmit information about vehicle operation. For example, acknowledgement signal sending unit 26 may inform control tower 10 that its instructions have been complied with, may report any compliance actions taken, or may report engine controller settings, sensor data, or other vehicle status information such as location or vehicle operating parameter values or history.

Figure 3:
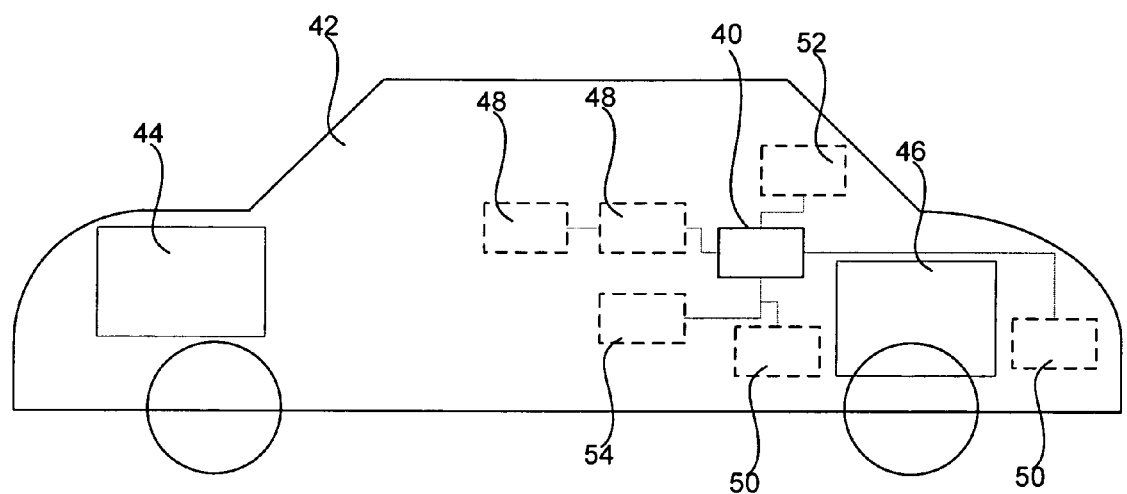
FIG. 3 is a schematic of an exhaust controller for a vehicle.

FIG. 3 is a schematic of an exhaust controller 40 for a vehicle 42 having an engine 44 and an exhaust system 46. The exhaust controller 40 may optionally be operatively linked to one or more ambient condition sensors 48 or exhaust parameter sensors 50, a broadcast signal receiving unit 52, or a compliance reporting unit 54. The exhaust controller 40 is configured to determine an acceptable range for an exhaust parameter (exhaust gas temperature, exhaust gas temperature profile, exhaust gas composition, exhaust gas back pressure, catalytic converter reactive area, exhaust gas flow path, catalyst selection, sequestration of at least one exhaust gas component, exhaust gas flow rate, exhaust particulates density, exhaust particulate composition, exhaust particulate size, concentration of exhaust components at a selected location in an exhaust flow path, coolant temperature, or inlet-exhaust thermal coupling) responsive to an ambient condition (e.g., temperature, pressure, partial pressure of an atmospheric component, local level of a selected pollutant, local insolation values such as local UV fraction, humidity, precipitation, wind conditions such as magnitude or direction, road cover conditions, time, traffic conditions, local rules, altitude, location, or local level of CO, $CO_2$, $NO_x$, $O_3$, or airborne particulates), including a predicted ambient condition. Exhaust controller 40 then directs engine 44 or exhaust system 46 to maintain the exhaust parameter within the acceptable range (e.g., using one or more exhaust parameter sensors 50 for feedback control of the exhaust parameter). The acceptable range may include an acceptable range for the time averaged value of the exhaust parameter during a time interval, or it may include an acceptable range for a designated function of the exhaust parameter (e.g., allowing some out-of-range values as long as extreme values are not reached, or preferring lower values to higher values within the range). The acceptable range may also be established for multiple exhaust parameters, or for a function of multiple exhaust parameters. The acceptable range may also include an acceptable range for the value of the exhaust parameter during a probability weighted time interval (e.g., the parameter must be within range for at least 80% of the time).

In one embodiment, exhaust controller 40 may use an ambient condition sensor 48 to determine that precipitation is falling around the vehicle, and may direct the engine 44 or the exhaust system 46 to shift to an operational mode that minimizes output of waterborne contaminants. In another embodiment, the exhaust controller 40 may recognize that the vehicle has entered an emissions-controlled zone (e.g., by receiving a broadcast signal via receiving unit 52 or by determination of vehicle location via GPS or other navigational systems) and may direct the exhaust system 46 to maintain emissions below a specified level for the emissions-controlled zone, for example by shifting the exhaust flow path to change catalytic area or catalyst types. The exhaust controller 40 may further be linked to a compliance reporting unit 54, which may be configured to transmit a record of exhaust parameter adjustments. For example, the compliance reporting unit 54 may include a transmitter that sends a compliance signal to a remote unit during vehicle operation, or it may include a memory device that stores a record of exhaust parameter values for later transmission (e.g., for transmission via a direct or wireless connection during vehicle fueling).

Optional exhaust parameter sensors 50 may be internal or external to the vehicle, and may include without limitation sensors for exhaust temperature, pressure, gas composition, water vapor content or content of other specific gases or vapors, or particulate content, size distribution, and composition. Exhaust parameters may be sensed as a function of time, position, or other parameter (e.g., engine load). Sensors may include electromechanical sensors (e.g., for pressure or temperature), electrochemical sensors, MEMS sensors, active or passive optical sensors employing free-space or fiber optics (e.g., laser absorption spectrometer or laser particulate sensor), electromagnetic sensors including RF, microwave, and millimeter-wave sensors, or acoustic sensors. In some cases, a plurality of sensors 50 may be used to measure an exhaust parameter (e.g., an array of temperature sensors may produce a temperature profile along the exhaust path, or a plurality of gas sensors may be used to analyze exhaust composition).

Figure 4:
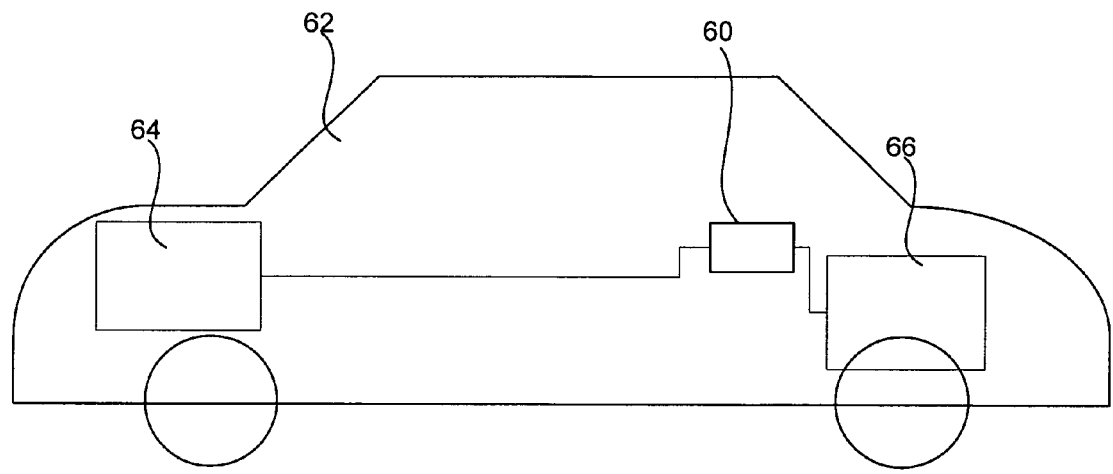
FIG. 4 is a schematic of a time-sensitive exhaust controller for a vehicle.

FIG. 4 is a schematic of a local-time-sensitive vehicle controller 60 for a vehicle 62 having an engine 64 and an exhaust system 66. The vehicle controller 60 is configured to determine an acceptable range for a vehicle parameter during a selected time period and to direct engine 64 or exhaust system 66 to maintain the vehicle parameter in the acceptable range during the selected time period. For example, vehicle controller 60 may determine that more $CO_2$ may be emitted during nighttime hours, and direct the exhaust system to relax limits on $CO_2$ production between sunset and sunrise. In some embodiments, the selection of a time period and a corresponding acceptable range for the exhaust parameter may be based upon local statutes (which may be preloaded into the logic of vehicle controller 60, determined by downloading or otherwise receiving information from a central source such as a municipal control tower, or determined by other means).

Figure 5:
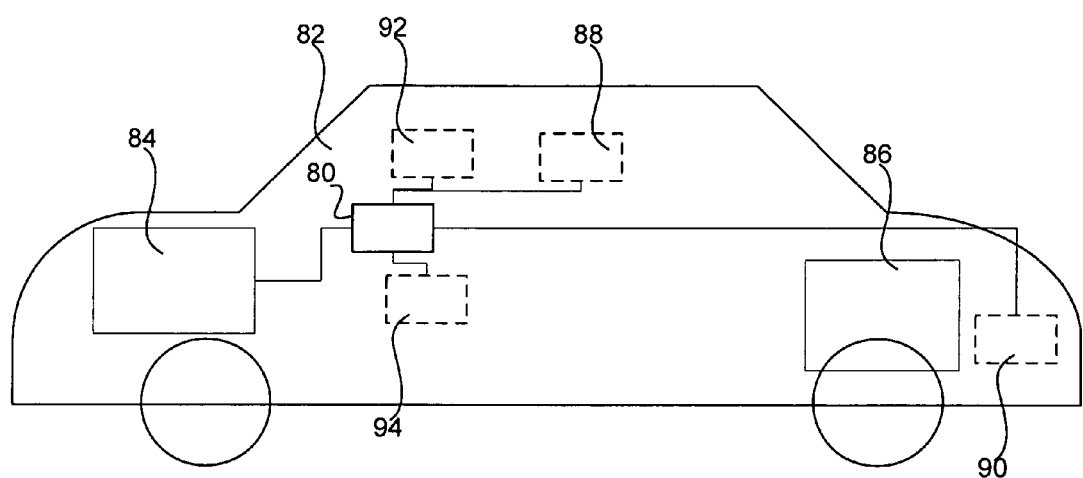
FIG. 5 is a schematic of a traffic-condition-responsive engine controller for a vehicle.

FIG. 5 is a schematic of an engine controller 80 for a vehicle 82 having an engine 84 and an exhaust system 86. The engine controller 80 may be operatively linked to one or more ambient condition sensors 88 or vehicle parameter sensors 90, a signal receiving unit 92, or a compliance reporting unit 94. The engine controller is configured to determine an acceptable range for an engine operating parameter (compression ratio, combustion timing, fuel composition, number of operating cylinders, battery usage, engine usage of electrical energy, inlet temperature, or inlet-exhaust thermal coupling) responsive to traffic conditions. It then directs the engine 84 to maintain the engine operating parameter within the determined acceptable range. For example, a vehicle may shift to a smaller number of operating cylinders when traffic is determined to be flowing at a relatively constant speed and high power is not expected to be needed.

In some embodiments, traffic conditions may be sensed by ambient condition sensors 88 (e.g., optical sensing of positions of nearby vehicles), by vehicle parameter sensors 90 (e.g., accelerometers, GPS, or other vehicle location sensors), or by monitoring vehicle operation (e.g., throttle and gear settings or brake usage). In other embodiments, traffic data may be received from an external source (e.g., via optional signal receiving unit 92), such as a central repository of traffic information, or another vehicle or vehicles.

In some embodiments, optional compliance reporting unit 94 may be configured to transmit a record of engine operating parameter adjustments. For example, the compliance reporting unit 94 may include a transmitter that sends a compliance signal to a remote unit during vehicle operation, or it may include a memory device that stores a record of engine parameter values for later transmission (e.g., for transmission via a direct or wireless connection during vehicle fueling).

Various embodiments of vehicle controllers and signaling units have been described herein. In general, features that have been described in connection with one particular embodiment may be used in other embodiments, unless context dictates otherwise. For example, the acknowledgement signal sending units described in connection with FIG. 1 and FIG. 2 may be employed in any of the embodiments described herein. For the sake of clarity, descriptions of such features have not been repeated, but will be understood to be included in the different aspects and embodiments described herein.

In a general sense, those skilled in the art will recognize that the various aspects described herein which can be implemented, individually or collectively, by a wide range of hardware, software, firmware, or any combination thereof can be viewed as being composed of various types of "electrical circuitry." Consequently, as used herein, "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes or devices described herein, or a microprocessor configured by a computer program which at least partially carries out processes or devices described herein), electrical circuitry forming a memory device (e.g., forms of random access memory), or electrical circuitry forming a communications device (e.g., a modem, communications switch, or optical-electrical equipment). Those having skill in the art will recognize that the subject matter described herein may be implemented in an analog or digital fashion or some combination thereof.

It will be understood by those within the art that, in general, terms used herein, and especially in the appended claims are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of introductory phrases such as "at least one" or "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a cylinder" should typically be interpreted to mean "at least one cylinder"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two cylinders," or "a plurality of cylinders," without other modifiers, typically means at least two cylinders). Furthermore, in those instances where a phrase such as "at least one of A, B, and C," "at least one of A, B, or C," or "an [item] selected from the group consisting of A, B, and C," is used, in general such a construction is intended in the sense one having skill in the art would understand the convention (e.g., any of these phrases would include but not be limited to systems that have A alone, B alone, C alone, A and B together, A and C together, B and C together, and/or A, B, and C together). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of controlling an exhaust system in a vehicle, comprising:
   determining an ambient condition; and
   responsive to the determined ambient condition, adjusting an exhaust parameter of the exhaust system, the exhaust parameter selected from the group consisting of exhaust gas temperature, exhaust gas temperature profile, exhaust gas composition, exhaust gas back pressure, catalytic converter reactive area, exhaust gas flow path, catalyst selection, sequestration of at least one exhaust gas component, exhaust gas flow rate, exhaust particulates density, exhaust particulate composition, exhaust particulate size, concentration of exhaust components at a selected location in an exhaust flow path, coolant temperature, and inlet-exhaust thermal coupling.

2. The method of claim 1, wherein the ambient condition is selected from the group consisting of temperature, pressure, partial pressure of an atmospheric component, local level of a selected pollutant, local insolation values, humidity, precipitation, wind conditions, road cover conditions, traffic conditions, local rules, altitude, and location.

3. The method of claim 1, further comprising transmitting a record of the adjusting of the exhaust parameter.

4. The method of claim 3, wherein transmitting a record includes transmitting a record wirelessly.

5. A method of controlling a vehicle, comprising:
   responsive to a local time, adjusting a vehicle parameter of the vehicle, the vehicle parameter selected from the group consisting of compression ratio, timing of commencement of fuel combustion, timing of fuel injection, timing of fuel introduction into an air-inlet stream, valve timing, fuel composition, fuel-oxidizer ratio, air inlet temperature, air inlet pressure, number of operating cylinders, battery usage, battery charge, engine or drive-train usage of electrical energy, engine operating rate, output torque, exhaust gas temperature, exhaust gas temperature profile, exhaust gas composition, exhaust gas back pressure, catalytic converter reactive area, exhaust gas flow path, catalyst selection, sequestration of at least one exhaust gas component, exhaust gas flow rate, exhaust particulates density, exhaust particulate composition, exhaust particulate size, concentration of exhaust components at a selected location in an exhaust flow path, coolant temperature, and inlet-exhaust thermal coupling.

6. The method of claim 5, further comprising transmitting a record of the adjusting of the vehicle parameter.

7. The method of claim 6, wherein transmitting a record includes transmitting a record wirelessly.

8. A vehicle control system for a vehicle having an engine and an exhaust system, comprising:
   an exhaust controller configured to determine an acceptable range for a vehicle parameter for a selected local time period and to direct the vehicle to maintain the vehicle parameter within the acceptable range during the selected local time period,
   wherein the vehicle parameter is selected from the group consisting of compression ratio, timing of commencement of fuel combustion, timing of fuel injection, timing of fuel introduction into an air-inlet stream, valve timing, fuel composition, fuel-oxidizer ratio, air inlet temperature, air inlet pressure, number of operating cylinders, battery usage, battery charge, engine or drive-train usage of electrical energy, engine operating rate, output torque, exhaust gas temperature, exhaust gas temperature profile, exhaust gas composition, exhaust gas back pressure, catalytic converter reactive area, exhaust gas flow path, catalyst selection, sequestration of at least one exhaust gas component, exhaust gas flow rate, exhaust particulates density, exhaust particulate composition, exhaust particulate size, concentration of exhaust components at a selected location in an exhaust flow path, coolant temperature, and inlet-exhaust thermal coupling.

9. The vehicle control system of claim 8, wherein the vehicle is configured to determine the acceptable range for the vehicle parameter for the selected local time period based at least in part on vehicle location.

10. The vehicle control system of claim 8, wherein the vehicle controller includes an internal clock.

11. The vehicle control system of claim 8, wherein the vehicle controller is configured to determine time from an external signal.

12. The vehicle control system of claim 8, further comprising a compliance reporting unit configured to transmit a record of vehicle parameter adjustments.

13. The vehicle control system of claim 12, wherein the compliance reporting unit is configured to transmit a record wirelessly.

14. An exhaust control system for a vehicle having an engine and an exhaust system, comprising:
  an exhaust controller configured to determine an acceptable range for an exhaust parameter responsive to an ambient condition and to direct the exhaust system to maintain the exhaust parameter within the acceptable range,
  wherein the exhaust parameter is selected from the group consisting of exhaust gas temperature, exhaust gas temperature profile, exhaust gas composition, exhaust gas back pressure, catalytic converter reactive area, exhaust gas flow path, catalyst selection, sequestration of at least one exhaust gas component, exhaust gas flow rate, exhaust particulates density, exhaust particulate composition, exhaust particulate size, concentration of exhaust components at a selected location in an exhaust flow path, coolant temperature, and inlet-exhaust thermal coupling.

15. The exhaust control system of claim 14, wherein the ambient condition is selected from the group consisting of temperature, pressure, partial pressure of an atmospheric component, local level of a selected pollutant, local insolation values, humidity, precipitation, wind conditions, road cover conditions, traffic conditions, local rules, altitude, and location.

16. The method of claim 14, wherein determining an acceptable range for an exhaust parameter responsive to an ambient condition includes determining an acceptable range for an exhaust parameter responsive to a predicted ambient condition.

17. The exhaust control system of claim 14, wherein the exhaust controller is configured to determine an acceptable range for an exhaust parameter responsive to an ambient condition by selecting from a set of exhaust profiles.

18. The exhaust control system of claim 14, wherein the acceptable range for an exhaust parameter includes an acceptable range for the time averaged value of the exhaust parameter during a time interval.

19. The exhaust control system of claim 14, wherein the acceptable range for an exhaust parameter includes an acceptable range for a designated function of the exhaust parameter.

20. The exhaust control system of claim 14, wherein the acceptable range for an exhaust parameter includes an acceptable range for a second exhaust parameter.

21. The exhaust control system of claim 14, wherein the acceptable range for an exhaust parameter includes an acceptable range for a designated function of a plurality of exhaust parameters.

22. The exhaust control system of claim 14, wherein the acceptable range for an exhaust parameter includes an acceptable range for the value of the exhaust parameter during a probability weighted time interval.

23. The exhaust control system of claim 14, wherein the acceptable range for an exhaust parameter includes a time profile for the acceptable range for an exhaust parameter.

24. The exhaust control system of claim 14, further comprising a compliance reporting unit configured to transmit a record of exhaust parameter adjustments.

25. The exhaust control system of claim 24, wherein the compliance reporting unit is configured to transmit a record wirelessly.

26. The exhaust control system of claim 14, further comprising an exhaust parameter sensor, wherein the exhaust controller is configured to accept a sensor signal from the exhaust parameter sensor indicative of the state of the exhaust parameter and to use the sensor signal to direct the exhaust system to maintain the exhaust parameter within the acceptable range.

27. The exhaust control system of claim 26, wherein the exhaust parameter sensor is selected from the group consisting of electromagnetic sensors, spectroscopic sensors, thermal sensors, chemical sensors, pressure sensors, acoustic sensors, vibration sensors, mass sensors, electromechanical sensors, electrochemical sensors, microelectromechanical devices, and optical sensors.

28. The exhaust control system of claim 26, wherein the exhaust parameter sensor is configured to measure a property selected from the group consisting of temperature, pressure, gas composition, vapor composition, particulate content, particulate composition, particulate size distribution, flow rate, density, force, strain, and displacement.

29. The exhaust control system of claim 26, wherein the exhaust parameter sensor is internal to the vehicle.

30. The exhaust control system of claim 26, wherein the exhaust parameter sensor is external from the vehicle.

* * * * *